June 19, 1923.
G. A. LYON
1,459,227
REAR ATTACHING DEVICE
Filed March 27, 1922
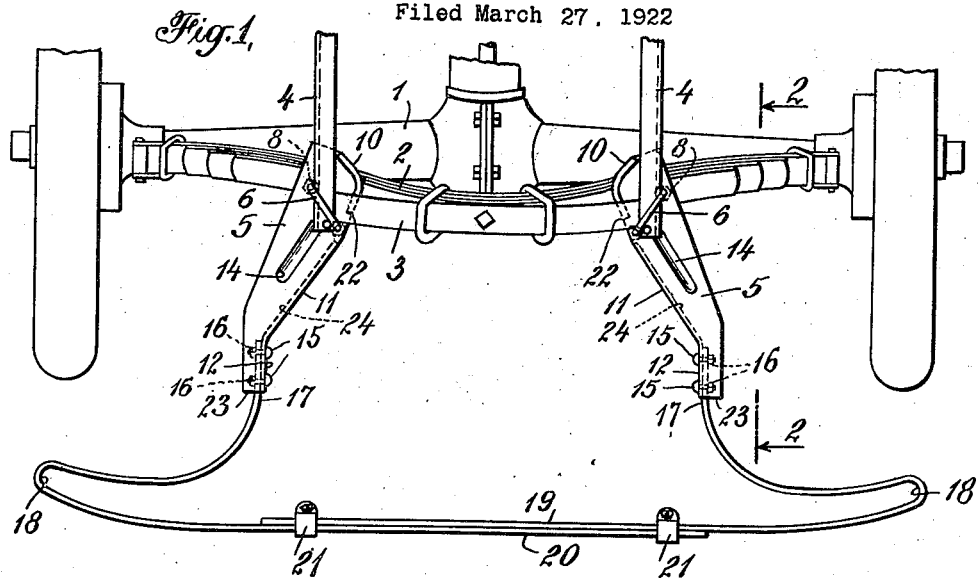
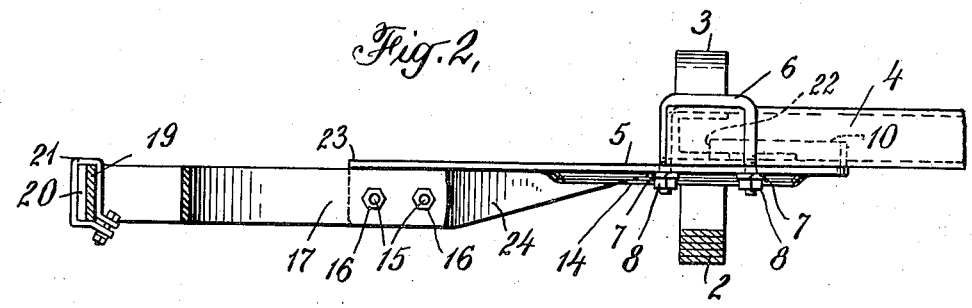
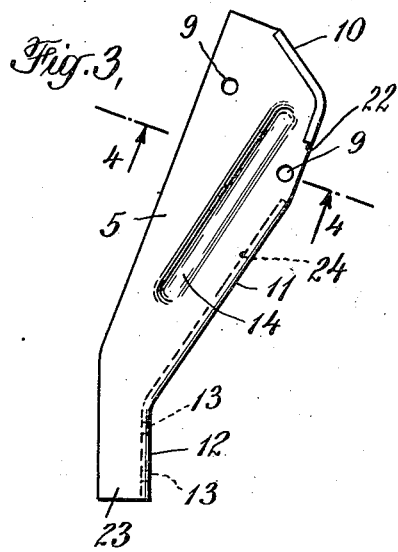
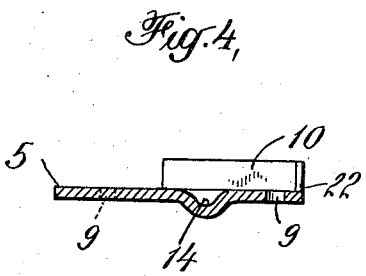
INVENTOR
George Albert Lyon
BY
Harry L. Duncan
ATTORNEY.

Patented June 19, 1923.

1,459,227

UNITED STATES PATENT OFFICE.

GEORGE ALBERT LYON, OF PHILADELPHIA, PENNSYLVANIA.

REAR ATTACHING DEVICE.

Application filed March 27, 1922. Serial No. 547,326.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Rear Attaching Devices, of which the following is a specification, taken in connection with the accompanying drawing.

This invention relates especially to attaching devices for attaching resilient buffers or bumpers to the rear of Ford or similar automobiles and comprises special attaching plates adapted to be clamped or bolted beneath the rear end of the frame channels as by U-bolts extending around the channels while flanges or locking lugs or projections on the plates promote the alignment and gripping engagement of the plates with the frame channels and adjacent spring angle iron or other supporting member. These attaching plates preferably diverge outward as they extend rearward from the automobile frame and are provided with stiffening ribs or flanges to give them increased stiffness against vertical bending forces while adjacent their free rear ends they are preferably provided with a vertical clamping face which may have bolt holes to assist in bolting or clamping the attaching arms or portions of the buffer thereto.

In the accompanying drawing which shows in a somewhat diagrammatic way an illustrative embodiment of this invention:

Fig. 1 is a top view.

Fig. 2 is a vertical sectional view taken substantially along the line 2—2 of Fig. 1.

Fig. 3 is an enlarged top view of the attaching plate separated from the other parts, and Fig. 4 is a transverse sectional view thereof taken substantially along the line 4—4 of Fig. 3.

The attaching plates used in this device are preferably formed of spring steel plate or strip $\frac{3}{16}$ of an inch thick more or less and preferably hardened and tempered after they have been cut and bent to shape in suitable dies or otherwise. As shown in Figs. 1 and 3, the attaching plate 5 may have a relatively wide flat clamping surface on its upper face adjacent one end where it is adapted to be clamped or secured to the frame members and this part of the plate may be stiffened and strengthened as by forming one or more depressed stiffening ribs such as 14 therein, preferably without projecting undesirably above the upper surface. Both holes such as 9 may be formed in this part of the plate 5 to accommodate a U-bolt 6 for example, which may, as indicated in Figs. 1 and 2, extend over the rear end of the frame channel 4 and securely bolt the attaching plate thereto in connection with the lock washers 7 and nuts 8. It is desirable to form one or more retaining locking lugs or flanges on this part of the attaching plate in such position as to engage or cooperate with the frame channel or transverse spring angle iron 3 to which the spring 2 may be secured substantially above the axle casing 1. For this purpose the retaining flanges 10 may be formed on these plates and preferably provided with locking ends 22 which may extend under the spring angle iron to substantially engage its rear flange when the attaching plates are in their adjusted position shown in Fig. 1. It is of course understood that each of these attaching plates may be inserted laterally under the rear end of the frame channel so as to bring these locking lugs or flanges into proper position before the U-bolts or other clamping devices are put in place and tightened so as to hold the plates securely and rigidly in their rearwardly extending position with their upper surfaces at substantially the same level with the lower edges of their frame channels.

The inner adjacent edges of these attaching plates 5 which preferably diverge outwardly as they extend backward from the automobile frame may be formed with depending stiffening flanges such as 24 which may overlap the stiffening rib 14 and increase in vertical height as they extend rearward as is shown in Fig. 2. This flange at the rear of the attaching plate is bent into substantially parallel position so as to form a vertical clamping face 12 which may be provided with holes or slots such as 13 through which the clamping bolts 15 may extend to rigidly secure thereto the bumper attaching members or strip ends 17 of the buffer when the nuts 16 are tightened. These nuts preferably draw the attaching ends of the bumper up against the upper aligning face 23 of the attaching plate so as to give a more rigid connection at this point. The buffer may be of any suitable or desired construction preferably comprising resilient strips attaching arms or members such as 17 which may in some cases be integral with the end loops 18 and inwardly extending impact receiving members 19, 20. In the case of a Lyon type buffer these impact receiving members may overlap and be secured in adjusted position as by the enclosing clamping devices 21 of the usual form. After these attaching plates have been connected to the automobile frame adjacent the rear axle casing 1 the buffer strips or members may be bolted to these attaching plates either before or after the strips have been connected together and in some cases the buffer strips may be forced apart so as to resiliently force the attaching plates outward at their projecting rear ends which tends to increase the gripping engagement of the U-bolts with the automobile frame members.

This invention has been described in connection with a number of embodiments, forms, proportions, parts, arrangements, materials, methods of connection and use, to the details of which disclosure the invention is not of course to be limited since what is claimed as new and what is desired to be secured by Letters Patent is set forth in the appended claims.

1. In automobile buffer devices, a spring strip buffer comprising attaching members, connected end loops and overlapping impact receiving members adjustably connected in reenforcing position, and attaching plates of tempered sheet steel each having adjacent one end a substantially flat upper clamping surface adapted to fit beneath the rear ends of the frame channels and spring angle iron of a Ford automobile and formed with retaining flanges to engage said frame members and align the plate with respect thereto, U-bolts extending around said frame members and passing through holes in said attaching plates to securely connect the plates thereto, stiffening bent portions formed on said plates and comprising a depressed stiffening rib and edge stiffening flange forming a substantially vertical clamping face at the free end of the plate adjacent the upper aligning face thereof and bolts to connect the attaching members of the buffer to said vertical clamping faces.

2. In automobile buffer devices, a spring strip buffer comprising attaching members and impact receiving members, and attaching plates each having adjacent one end a substantially flat upper clamping surface adapted to fit beneath the rear ends of the frame channels and spring angle iron of a Ford automobile, U-bolts extending around said frame members and passing through holes in said attaching plates to securely connect the plates thereto, stiffening bent portions formed on said plates and comprising a depressed stiffening rib and edge stiffening flange forming a substantially vertical clamping face at the free end of the plate adjacent the upper aligning face thereof and bolts to connect the attaching members of the buffer to said vertical clamping faces.

3. In automobile buffer devices, a spring strip buffer comprising attaching members and impact receiving members, and attaching plates each having adjacent one end a substantially flat upper clamping surface secured beneath the rear ends of the frame channels and spring angle iron of a Ford automobile, stiffening bent portions formed on said plates perpendicular to said clamping surface and comprising edge stiffening flanges forming substantially vertical clamping faces at the free end of the plates to which the attaching members of the buffer are secured.

4. In automobile buffer attaching devices, forged steel attaching plates having adjacent one end substantially flat upper clamping surfaces adapted to fit beneath the rear ends of the frame channels of a Ford automobile and formed with aligning retaining members adapted to engage said frame members and align the plate with respect thereto, U-bolts extending around said frame members and passing through holes in said attaching plates to securely connect them to the frame members said attaching plates having outwardly diverging gradually narrowing rear ends and having stiffening bent portions comprising edge stiffening flanges forming substantially vertical clamping faces at the free rear ends of the plates adjacent the upper aligning face thereof to which the attaching members of the buffer may be connected.

5. In automobile buffer attaching devices, forged steel attaching plates having adjacent one end clamping surfaces adapted to fit beneath and be secured to the rear ends of the frame channels of a Ford automobile, said attaching plates having outwardly diverging gradually narrowing rear ends and having stiffening bent portions comprising edge stiffening flanges forming substantially vertical clamping faces at the free rear ends of the plates perpendicular to said clamping surface to which the attaching members of the buffer may be connected.

6. In automobile buffer attaching devices, forged attaching plates of tempered sheet steel each having adjacent one end a substantially flat upper clamping surface adapted to fit beneath the rear ends of the frame channels of a Ford automobile and formed with aligning retaining members adapted to engage the automobile frame members and align the plate with respect thereto, U-bolts extending around said frame members and passing through holes in said attaching plates to securely connect them to the frame members, stiffening bent portions formed on said plates and comprising an edge stiffening flange forming a substantially vertical clamping face at the free end of the plate adjacent the upper aligning face thereof to which the attaching members of the buffer may be connected.

7. In automobile buffer attaching devices, forged steel attaching plates each having adjacent one end a substantially flat upper clamping surface adapted to fit beneath and be secured to the rear ends of the frame members of a Ford automobile and formed with aligning retaining members adapted to engage said frame members and align the plate with respect thereto, stiffening bent portions formed on said plates and comprising an edge stiffening flange forming a substantially vertical clamping face at the free end of the plate to which the attaching member of the buffer may be connected.

8. In automobile buffer attaching devices, forged steel attaching plates each having adjacent one end a clamping surface adapted to fit and be secured to the rear ends of the frame members of a Ford automobile and formed with aligning members adapted to engage said frame members and align the plate with respect thereto, stiffening bent portions formed on said plates and comprising a stiffening flange forming a substantially vertical clamping face at the free end of the plate to which the attaching member of the buffer may be connected.

GEORGE ALBERT LYON.